United States Patent
Deshpande

(10) Patent No.: US 10,234,144 B2
(45) Date of Patent: Mar. 19, 2019

(54) OVEN SYSTEM

(71) Applicant: Bipin Prabhakar Deshpande, Pune (IN)

(72) Inventor: Bipin Prabhakar Deshpande, Pune (IN)

(\*) Notice: Subject to any disclaimer, the term of this patent is extended or adjusted under 35 U.S.C. 154(b) by 0 days.

(21) Appl. No.: 15/721,917

(22) Filed: Oct. 1, 2017

(65) Prior Publication Data
US 2018/0100656 A1 Apr. 12, 2018

(30) Foreign Application Priority Data
Oct. 7, 2016 (IN) .............................. 201621034494

(51) Int. Cl.
| | | |
|---|---|---|
| *A21B 1/14* | (2006.01) | |
| *A21B 1/22* | (2006.01) | |
| *A47J 37/04* | (2006.01) | |
| *F24C 7/06* | (2006.01) | |
| *A21B 5/04* | (2006.01) | |
| *F24C 15/16* | (2006.01) | |
| *F27D 99/00* | (2010.01) | |
| *F24C 15/32* | (2006.01) | |
| *F27D 11/02* | (2006.01) | |

(52) U.S. Cl.
CPC ............... *F24C 7/062* (2013.01); *A21B 1/14* (2013.01); *A21B 5/04* (2013.01); *F24C 15/164* (2013.01); *F24C 15/166* (2013.01); *F24C 15/322* (2013.01); *F27D 99/007* (2013.01); *F27D 11/02* (2013.01)

(58) Field of Classification Search
None
See application file for complete search history.

(56) References Cited

U.S. PATENT DOCUMENTS

| | | | | |
|---|---|---|---|---|
| 2,848,592 A | * | 8/1958 | Mergen ................. | A47J 37/041 126/337 R |
| 2,900,482 A | * | 8/1959 | Aylor ....................... | F24C 7/00 126/25 A |
| 3,281,575 A | * | 10/1966 | Ferguson, Jr. ............ | F24C 7/06 219/404 |
| 4,780,597 A | * | 10/1988 | Linhart ................. | F24C 15/166 219/396 |
| 5,429,043 A | * | 7/1995 | Becker .................... | F24C 15/16 126/337 A |
| 5,693,246 A | * | 12/1997 | Han ..................... | H05B 6/6482 219/404 |
| 5,938,959 A | * | 8/1999 | Wang ................... | A47J 37/0623 126/20 |

(Continued)

*Primary Examiner* — Joseph M Pelham
(74) *Attorney, Agent, or Firm* — Mark M. Friedman

(57) ABSTRACT

The present invention in various embodiments provides an oven system, having movable heating panels adapted to a partitioning mechanism, to change the heating chamber into one or more compartments in the housing, as per user requirements. The partitioning mechanism with the movable heating panels may be adapted to the extendable member or walls of the oven chamber including base, side walls or top wall of the oven chamber. The rotational holders may be adapted in the extendable member or the base of the oven chamber for adapting the skewers or food holders. Thus, the present invention creates an oven system which allows the user to maximize and optimize the use of the oven system in a more effective way.

12 Claims, 8 Drawing Sheets

(56) References Cited

U.S. PATENT DOCUMENTS

| | | | | |
|---|---|---|---|---|
| 6,091,057 | A * | 7/2000 | Asami | F24C 7/06 |
| | | | | 219/404 |
| 6,242,716 | B1 * | 6/2001 | Wang | A47J 37/0623 |
| | | | | 219/404 |
| 6,439,109 | B1 | 8/2002 | Rehill | |
| 6,809,297 | B2 | 10/2004 | Moon et al. | |
| 6,965,095 | B1 | 11/2005 | Popeil et al. | |
| 7,628,105 | B2 * | 12/2009 | Umit | A47J 37/043 |
| | | | | 219/385 |
| 9,097,429 | B2 * | 8/2015 | Nam | F24C 15/16 |
| 2007/0241094 | A1 * | 10/2007 | Lau | A47J 37/049 |
| | | | | 219/404 |
| 2009/0120926 | A1 * | 5/2009 | Lee | F24C 7/06 |
| | | | | 219/395 |
| 2014/0131345 | A1 | 5/2014 | Watson et al. | |

* cited by examiner

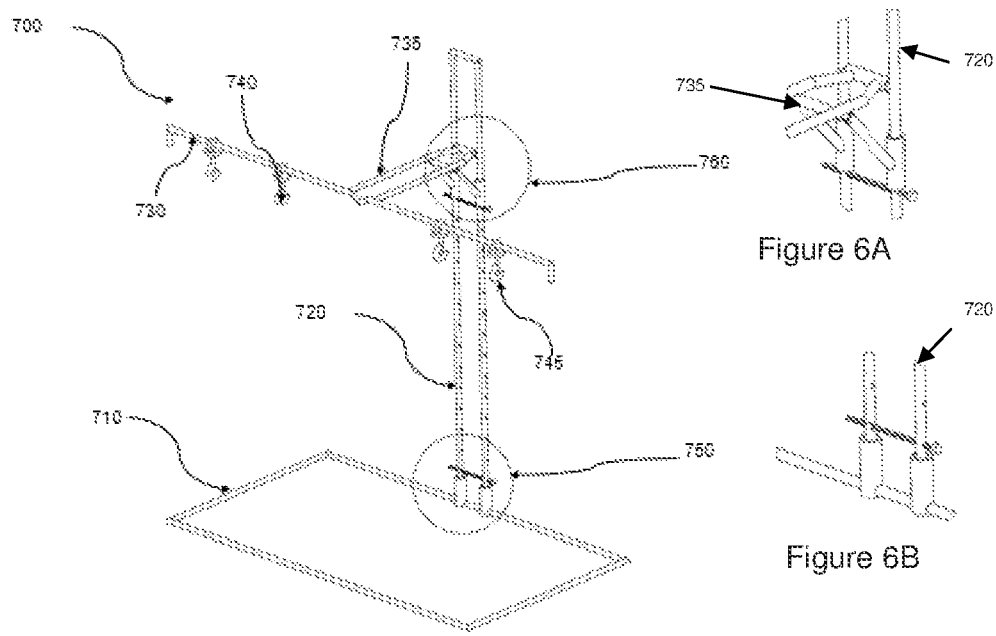
Figure 6A
Figure 6B
Figure 6
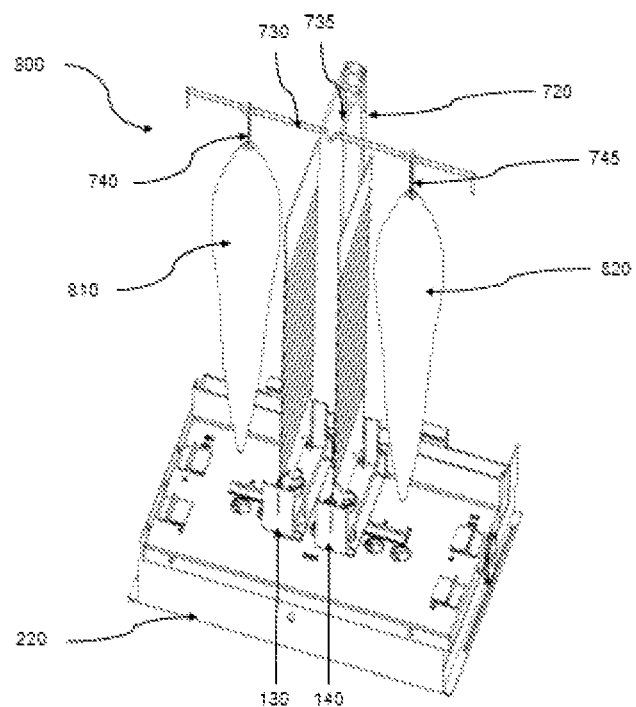
Figure 7

OVEN SYSTEM

FIELD OF THE INVENTION

The present invention relates to an oven system.

BACKGROUND OF THE INVENTION

Electric ovens usually have a broiler coil on top and a baking coil at the base and are often equipped with a horizontal rotisserie. Further, some ovens are specially designed with vertical skewers only, with no facility for baking. Some ovens have slots, wherein heating panels can be inserted horizontally or vertically inside the housing. Some ovens are available with a plurality of heating chambers.

The common theme is that food items are placed in ovens or mounted on a rotisserie, or suspended top down, such that maximum food surface area faces the heating panels, to receive maximum possible radiant heat. This limits usage of the oven, as how food items can be placed in the chamber is determined by the placement of the heating panels. Further, the size of the heating chamber and direction of heating in presently available oven systems are static, i.e. heating is from a fixed direction and from a fixed position only, thereby limiting the effective and optimal use of the oven. Moreover, the presently available ovens are designed for specific purpose and limited operations, such as, an oven for roasting on vertical skewers cannot be used for any other purpose such as baking.

SUMMARY OF THE INVENTION

Accordingly, the present invention in various embodiments provides oven systems to solve one or more problems discussed above.

In one embodiment, the present invention provides an oven system, comprising a housing, at least one heating element provided on at least one wall of the housing to provide predefined heat, at least one partitioning mechanism and at least one movable heating panel adaptable to each partitioning mechanism. According to the present invention, the partitioning mechanism moves or rotates or moves and rotates the movable heating panel in a predetermined direction to form one or more heating compartments of required size as per the user requirements within the housing to process food material. According to the present invention, the heating elements are collectively or selectively controlled to provide the predefined heat.

In another embodiment, the present invention provides an oven system comprising a housing, at least one heating element on at least one wall of the housing to provide predefined heat, an extendable member slidably secured in the housing and comprising at least one partitioning mechanism, and at least one movable heating panel coupled to each partitioning mechanism. According to the present invention, the partitioning mechanism moves or rotates or moves and rotates the movable heating panel in a predetermined direction to form one or more heating compartments of required size as per the user requirements within the housing to process food material and the heating elements are collectively or selectively controlled to provide the predefined heat.

According to the present invention, the partitioning mechanism includes a holding means for holding the movable heating panel for movement through slits provided in the wall, or the extendable member, and a rack-and-pinion and worm gear mechanism to move the movable heating panel within the housing.

In yet another embodiment, the present invention provides an oven system comprising a housing, a horizontal rotisserie for roasting food horizontally, and at least one rotational holder comprising a holding mechanism, either to hold and vertically rotate removable skewers, or to support food containers, or food stands for the food to be processed. Advantageously, the rotational holder mechanism is adapted on an extendable member or secured to the bottom of the oven system.

In an embodiment, the present invention also provides a food holder for an oven system, comprising a base frame, at least one top bar, the top bar comprises at least one removably adaptable rotatable hook and a connecting means for connecting the base frame and the top bar.

The oven of the present invention, due to the flexibility in creating horizontal or vertical heating chambers as per user requirements, food items of different shapes and sizes, can be kept in the oven at the base, or on horizontal shelves, or suspended vertically, or mounted on horizontal or vertical skewers, supported by appropriate food holders, food stands or trays, and at the same time, receive optimum heating, from one or more horizontally or vertically aligned movable heating panels, as may be required.

BRIEF DESCRIPTION OF DRAWINGS

Reference will be made to embodiments of the invention, example of which may be illustrated in the accompanying figure(s). These figure(s) are intended to be illustrative, not limiting. Although the invention is generally described in the context of these embodiments, it should be understood that it is not intended to limit the scope of the invention to these particular embodiments.

FIGS. 6, 6A and 6B show a food holder according to an embodiment of the present invention;

FIG. 7 shows the food holder of FIG. 6 mounted on the extendable member according to an embodiment of the present invention.

DETAILED DESCRIPTION OF THE INVENTION

Figure 1A:
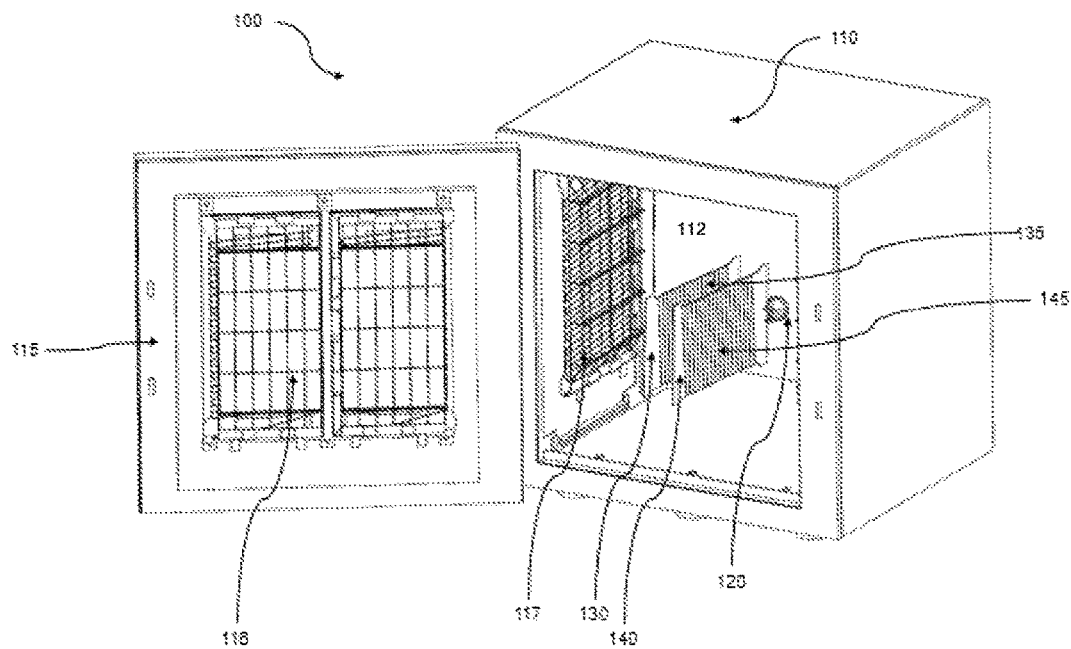
FIG. 1A shows an oven system according to an embodiment of the invention, with movable heating panels close, and parallel to the side walls.

In general, the present invention in various embodiments provides an oven system, having movable heating panels adapted to a partitioning mechanism, to change the heating chamber into one or more compartments in the housing, as per user requirements. The partitioning mechanism with the movable heating panels may be adapted to the extendable member or walls of the oven chamber including base, side walls or top wall of the oven chamber. The rotational holders may be adapted in the extendable member or the base of the oven chamber for adapting the skewers or food holders. Thus, the present invention creates an oven system which allows the user to maximize and optimize the use of the oven system in a more effective way.

Accordingly, the present invention in one embodiment provides the oven system comprising a housing, at least one heating element on at least one wall of the housing to provide predefined required heating, at least one partitioning mechanism, and at least one movable heating panel adaptable to each partitioning mechanism. The partitioning mechanism moves or rotates or moves and rotates the movable heating panel in a predetermined direction to form one or more heating compartments of required size as per the user requirements within the housing to process food material.

According to the present invention, the heat output of the heating elements can be collectively or selectively controlled.

According to the present invention, the partitioning mechanism is adapted to one of the walls of the housing or to an extendable member slidably adaptable in the housing. The partitioning mechanism includes a holding means for holding the movable heating panel for movement through the slits provided in the wall or extendable member, and a rack-and-pinion and worm gear mechanism to move the movable heating panel within the housing. Advantageously, the movement of each partitioning mechanism can be collectively or selectively controlled.

According to the present invention, the movable heating panel is removably or fixedly coupled to the partitioning mechanism. The movable heating panel comprises at least one heating element on at least one side to provide required heat, the heat output of the heating elements can be collectively or selectively controlled. Advantageously, the movement of the movable heating panel can be automatically or manually controlled.

According to the present invention, the extendable member comprises at least one rotational holder having a mechanism to hold and rotate skewers, food containers, or food stands.

In another embodiment, the present invention provides an oven system, comprising a housing, at least one heating element on at least one wall of the housing to provide required heat, an extendable member secured in the housing, the extendable member comprising at least one partitioning mechanism, and at least one movable heating panel coupled to each partitioning mechanism, wherein the partitioning mechanism moves or rotates or moves and rotates the movable heating panel in a predetermined direction to form one or more heating compartments as per the user requirements within the housing to process food material.

According to the present invention, the heat output of each heating element can be collectively or selectively controlled.

Accordingly, in one more embodiment the present invention provides an oven system comprising a housing, a horizontal rotisserie for roasting food horizontally, and at least one rotational holder, comprising a holding mechanism to hold and vertically rotate skewers, or to place food containers, or food stands or combination thereof for the food to be processed, while suitably positioning the movable heating panels, vertically or horizontally for changing the heating chamber dimensions as per user requirements and/or providing heat if needed. Advantageously, the rotational holder mechanism is adapted on an extendable member or secured to the bottom of the oven system.

According to present invention, the movement of the rotational holder adapted on an extendable member or secured to the bottom of the oven system, and a rotational holder of the horizontal rotisserie for roasting food is controlled by a single motor or separate motors.

According to the present invention, the extendable member comprises a sliding mechanism for moving it outwards or inwards, the movement of the extendable member can be automatically or manually controlled. Additionally, the extendable member comprises at least one heating element for providing heat to the food material.

Accordingly, in further embodiment the present invention provides a food holder for an oven system, the food holder comprising a base frame, at least one top bar, and a connecting means for connecting the base frame and the top bar. According to the present invention, the top bar comprises at least one removably adaptable rotatable hook.

According to present invention, the height of the connecting means is adjustable.

According to present invention, the top bar connected to the connecting means moves upwards and/or downwards on the connecting means.

According to present invention, the rotatable hook is variably locatable on the top bar.

According to present invention, the rotatable hook allows a food item to rotate when the food item is suspended by the hook at one end and other end of the food is connected to a rotational holder, using a clamp or other means adapted to the rotational holder.

According to the present invention, the movement of the movable heating panels, extendable member, and rotational holders can be automatically controlled. The automatic movement of the movable heating panels, extendable member, and rotational holders, is controlled using the controller adapted to the components facilitating the movement based on user input. The user input can be provided through a remote control or through wired or wireless connection using smart devices such as mobile phones. Advantageously, the rotational holders can be operated independently, on the extendable member or on the base of the oven or both with appropriate motor availability and operability, without operating the heating panels and vice versa, for example, when the food in the food container having the paddles or blades has to be churned, kneaded, or chopped, without cooking, or when the food has to be cooked without rotating the same.

Figure 5A:
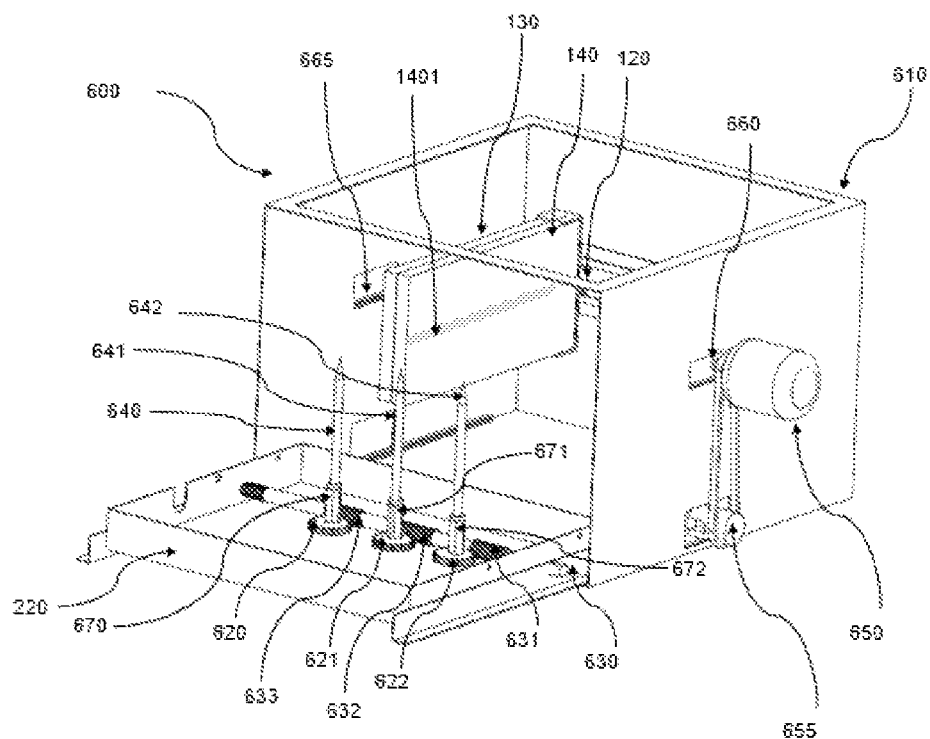
FIG. 5A shows a rotational mechanism of rotational holders adapted to an extendable member and its connectivity to the horizontal rotisserie motor.
Figure 5B:
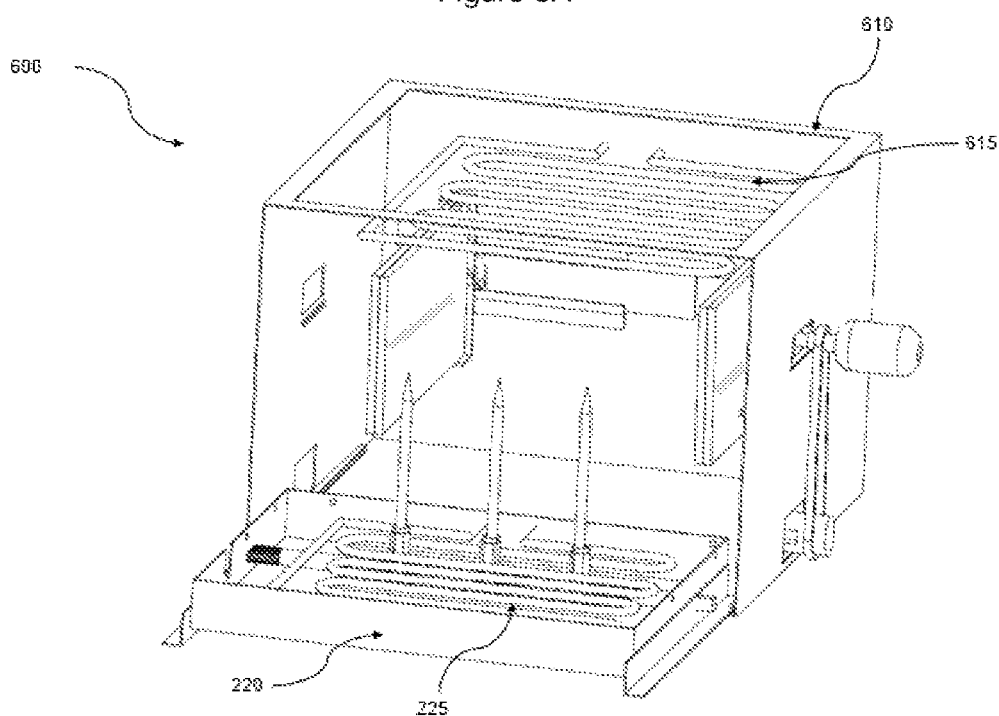
FIG. 5B shows a heating element adapted to an extendable member.

The oven system as described herein facilitates a user to create variable heating chambers based on food item dimensions and direction of heating required. The oven system facilitates cooking of food either in horizontal or vertical orientation or both. For example, the oven system as shown in FIG. 5B, allows cooking of food on horizontal rotisserie or vertical skewers or both. In addition, the positioning of the movable heating panels, in combination with the top and bottom heating coils, provides sufficient heat for cooking of food on horizontal rotisserie and vertical skewers. The example demonstrates how the same oven system can be used for cooking food using horizontal rotisserie and/or vertical skewers, together or separately, depending on user's choice.

Figure 3A:
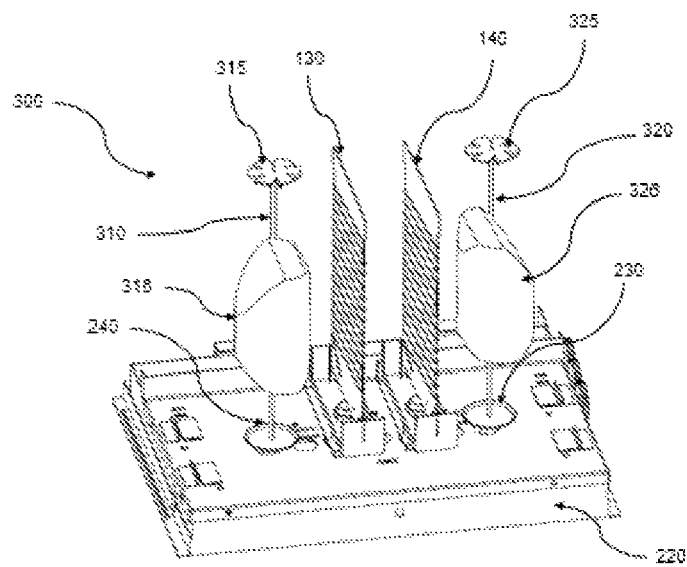
FIG. 3A shows an extendable member with removable skewers on which food items are mounted and a fan attached to the skewer.

In other example, as shown in FIG. 3A, the user can cook food on vertical skewers, with the oven system as described herein. By activating the partitioning mechanism, the user can move the movable heating panels to divide the housing of the oven into two parallel vertical heating chambers. The food is mounted on skewers adapted to the rotational holder of the extendable plate. The heating elements of the oven housing and movable heating panels are operated to provide optimum heat for cooking, and the skewers are rotated. The placement of the food in two heating chambers provides ease and enhanced efficiency in cooking the food and utilization of heating space within the oven, while ensuring air circulation using the removable fans firmly secured or mounted on the skewers.

In yet another example, the oven system as shown in the FIG. 2A to 2D, the functioning of movable heating panels adapted to the extendable member of the oven is described. The movable heating panels on the extendable member reduces risk of burns to the user's hand, due to heat in the oven, when placing or removing food from the oven. Using the oven system as described herein, the user can move the extendable member out from the housing, position the movable heating panels adapted to extendable member at a desired position to select desired heating chamber and place the food. Once the food is placed, the extendable member is pushed back into the housing and the oven is operated to cook the food. When the food is cooked, the extendable member is moved out from the housing to facilitate easy removal of food, thereby minimizing the risk of burns.

The subject matter is now described with reference to the drawings, wherein like reference numerals are used to refer to like elements throughout. In the following description, for purpose of explanation, numerous specific details are set forth in order to provide a thorough understanding of the claimed subject matter. It may be evident however, that such matter can be practiced with these specific details. In other instances, well-known structures as shown in diagram form in order to facilitate describing the invention.

Figure 1B:
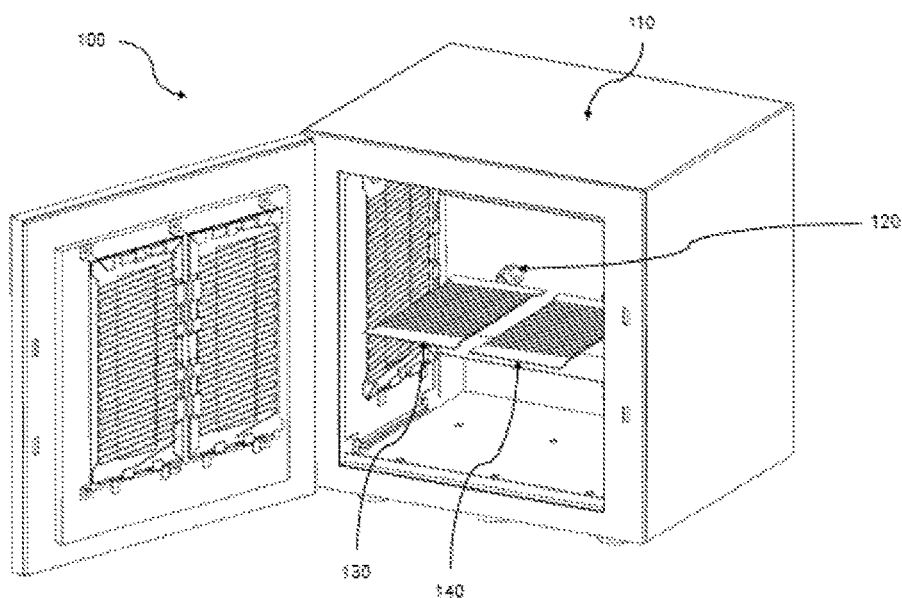
FIG. 1B shows an oven system according to an embodiment of the invention, with movable heating panels in horizontal position, parallel to top and bottom walls.

Referring FIG. 1 through FIGS. 1A and 1B show an oven system (100) according to an embodiment of the present invention wherein a partitioning mechanism (120) is secured on a back wall (112) of the housing (110) and two movable heating panels (130, 140) coupled to the partitioning mechanism (120) provided in the back wall (112). As shown in FIGS. 1A and 1B, the heating elements (116, 117) are also adapted on an openable door (115) and on one wall of the housing (110), respectively, to provide heat to cook food. The movable heating panel comprises of heating elements (135, 145).

In FIG. 1A, the movable heating panels (130, 140) in the housing (110) are arranged parallel to each other for creating two (2) vertical heating chambers. As shown in FIG. 1A, the movable heating panels (130, 140) can be positioned by the partitioning mechanism (120), manually or automatically, to create two (2) vertical heating chambers to cook food. This allows the user to use tall vessels or foods to adapt vertically. Further, when there is a single tall vessel/food to be heated/baked, the user can change the position of the movable heating panels (FIG. 2B) to create a single large chamber of required size and use the said single chamber for cooking of food.

In FIG. 1B, the movable heating panels (130, 140) within the housing (110) shown in FIG. 1A are moved and rotated and are brought in-line to each other for creating two (2) horizontal heating chambers according to an embodiment of the present inventions. This allows the user to heat, bake or cook food such as two pizzas or cakes at the same time in the top and bottom heating chambers, while receiving even heat from above and below. Moreover, as each heating element can be collectively or selectively controlled in the present invention, either one or both chambers can be used at a time to heat the food.

Figure 2A:
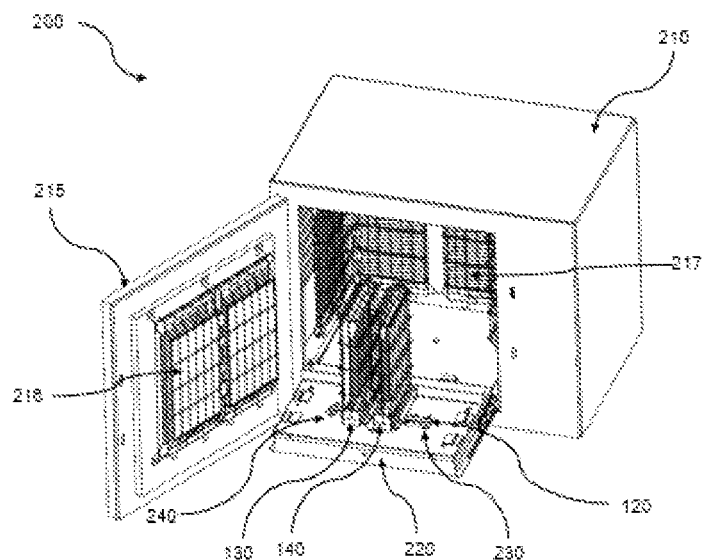
FIG. 2A shows another embodiment of an oven system according to the present invention, with movable heating panels adapted close and parallel to each other on extendable member at the bottom of the oven system, dividing the oven into two vertical chambers.
Figure 2B:
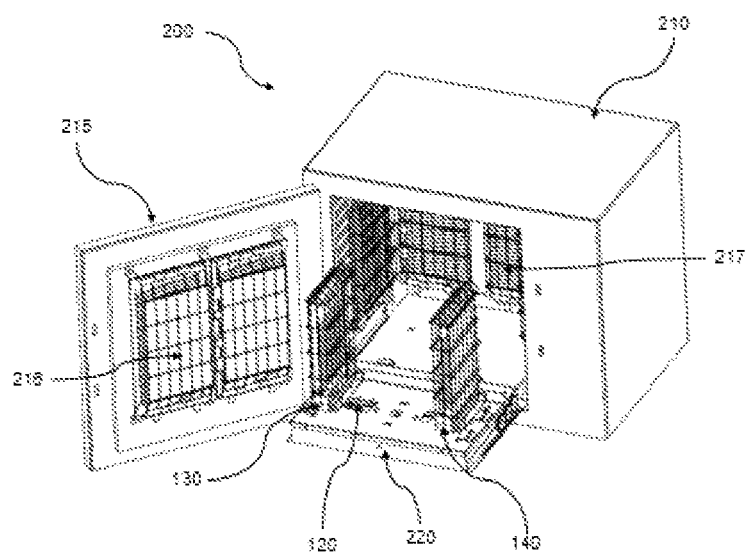
FIG. 2B shows the oven system of FIG. 2A having movable heating panels parallel to and away from each other, creating a single heating chamber.
Figure 2C:
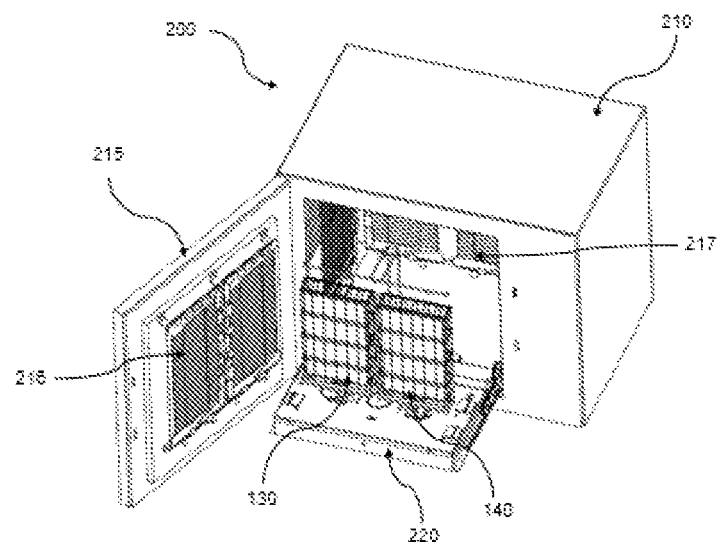
FIG. 2C shows the oven system of FIG. 2A having movable heating panels near and in-line to each other, creating two elongated heating chambers.
Figure 2D:
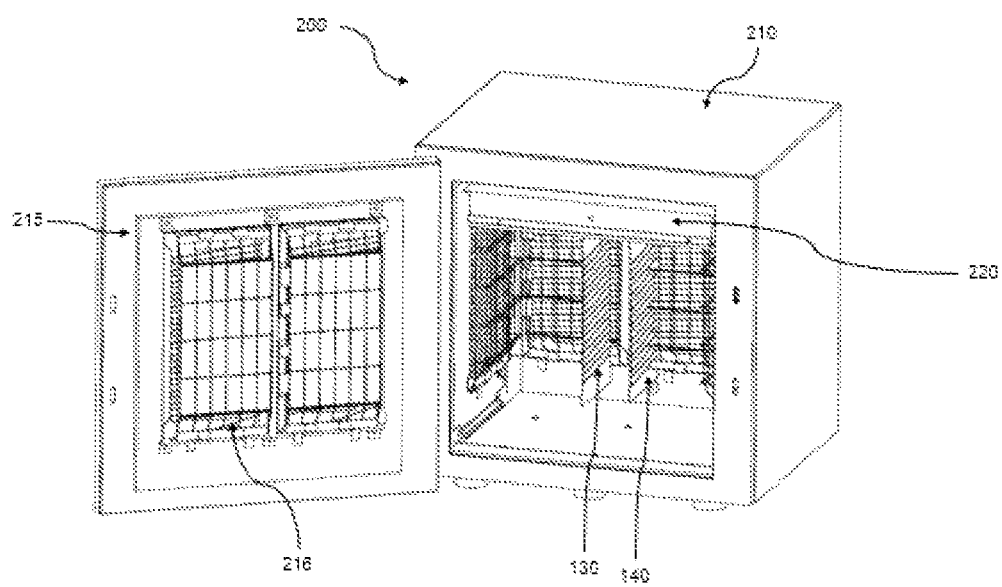
FIG. 2D shows an oven system having an extendable member at the top with movable heating panels suspended from the extendable member according to an embodiment of the present invention.

Referring FIG. 2 through FIGS. 2A to 2D that shows an oven system (200) with an extendable member (220) according to another embodiment of the present invention. The extendable member (220) comprises a partitioning mechanism (120) within it. The varied positions of the movable heating panels (130, 140) coupled to the partitioning mechanism (120) of the extendable member (220) are shown.

As shown in FIG. 2A to 2C the extendable member (220) is adapted at the bottom of the housing (210). The extendable member (220) comprises of the partitioning mechanism (120) and the movable heating panels (130, 140) are coupled to the partitioning mechanism (120) to move the movable heating panels within slits (not shown) to predetermined positions of the partitioning mechanism (120). The partitioning mechanism (120) facilitates the forward, backward and rotary movement of the movable heating panels (130, 140) as the requirements of the user to divide the housing of the oven system (200).

As shown in FIGS. 2A to 2D, the extendable member (220) can be pulled out or pushed in, manually or automatically. The movement of the extendable member (220) facilitates easy placement and removal of the food.

In FIG. 2A, the movable heating panels (130, 140) are near and parallel to each other, adapted to an extendable member (220) at the bottom of a housing (210) according to an embodiment of the present invention. Accordingly, the movable heating panels in FIG. 2A divides the housing of the oven system into two vertical heating chambers. FIG. 2B shows the movable heating panels (130, 140) are apart and parallel to each other, adapted to an extendable member (220) at the bottom of the housing (210) according to an embodiment of the present invention forming a single heating chamber in the housing. As in the present invention each heating element can be controlled collectively or selectively, the user can use the heating elements selectively to cook the food properly In FIG. 2C, the movable heating panels (130, 140) are near and in-line to each other, adapted to an extendable member (220) at the bottom of the housing (210). In this Figure, the heating chamber has been divided into two elongated vertical chambers.

The FIG. 2D shows an oven system (200) with movable heating panels (130, 140), the movable heating panels (130, 140) near and parallel to each other, adapted to an extendable member (220) at the top of the housing (210) according to an embodiment of the present invention.

Figure 3B:
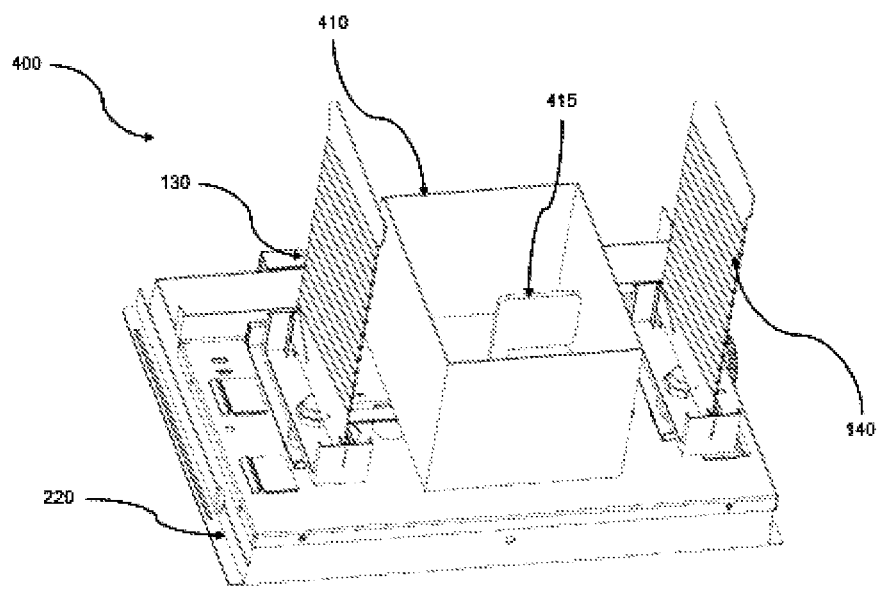
FIG. 3B shows the extendable member with a removable vessel, having paddle, mounted on the rotational holder.
Figure 3C:
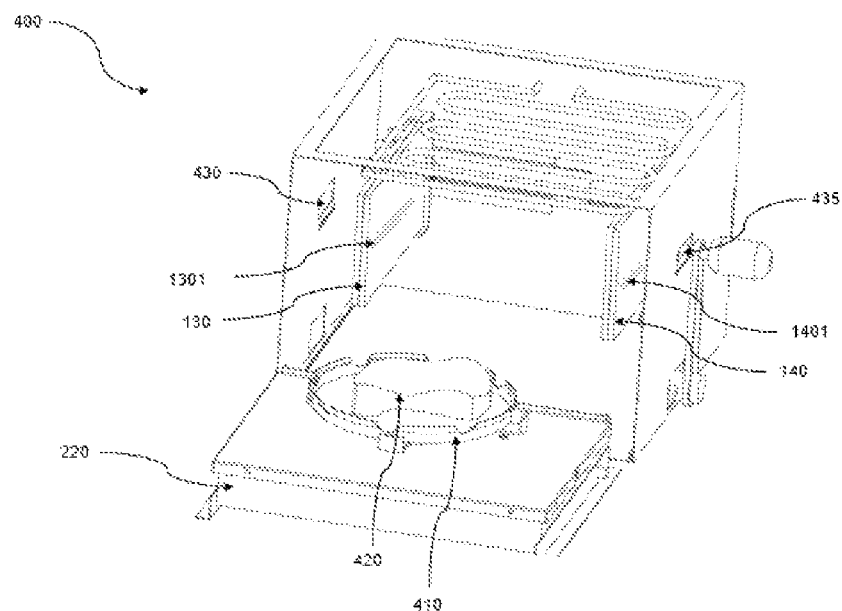
FIG. 3C shows the extendable member with a food stand mounted on the rotational holder.

Referring FIG. 3 through FIGS. 3A-3C shows the extendable member with various arrangements.

Referring FIG. 3A shows the heating panels (130, 140) dividing the housing of the oven (Refer FIG. 2A) vertically into two heating chambers and skewers (310, 320) adapted to a holding mechanism of rotational holders (230, 240) provided in the extendable member (220) according to an embodiment of the present invention. It is understood that various male-female means are known for clamping or holding vertically and ordinary skilled in the art can easily understand the same, hence holding mechanism of rotational holders for skewers not required to be described in detail.

As shown in FIG. 3A, the skewers (310,320) has food items (316, 326) and fans (315, 325) removably adapted on the top. The rotational holders (230, 240) rotates the skewers (310, 320) adapted to it, the food items (316, 326) are rotated for better cooking and the fans (315, 325) aids proper circulation of heat in the heating chamber of the oven (not shown). The food items (316, 326) such as chicken, beef, lamb, etc. may be mounted on the skewers (310, 320) and roasted.

Referring FIG. 3B shows the movable heating panels (130, 140) are arranged away and parallel to each other converting the housing of the oven into single chamber (Refer FIG. 2B) and a vessel (410), with a paddle (415), adapted to a holding mechanism of a rotational holder (not shown) on an extendable member (220) according to an embodiment of the present invention. The paddle (415) rotates when the rotational holder (not shown) is operated, while the vessel remains stationary. The food material inside the vessel (410) is churned with the rotation of the paddle (415) and simultaneously cooked through the heat provided from the movable heating panels (130, 140) within the oven (not shown). It is understood that various male-female means are known for clamping or holding paddle type means for example mixers, grinders etc. and ordinary skilled in the art can easily understand the same, hence holding relation between the rotational holders and the vessel with paddle not required to be described in detail.

FIG. 3C shows movable heating panels (130, 140) adapted to a back wall of the oven arranged away and parallel to each other. As shown in FIG. 3C, the food item is placed on a food stand (410) having a fixing slot (not shown) is adapted to the holding mechanism (not shown) of a rotational holder (not shown) on an extendable member (220). The food (420) such as cookies, cakes, and bread can be baked more efficiently by operation of the heating element (not shown) adapted to the extendable member (220).

As shown in FIG. 3C, the movable heating panels (130, 140) also have an opening (1301, 1401). The openings (1301, 1401) allows the shaft of the horizontal rotisserie (not shown) to be secured on the horizontal slot (430, 435). The horizontal slot (430, 435) facilitates rotation of the food mounted on the horizontal rotisserie.

Figure 4:
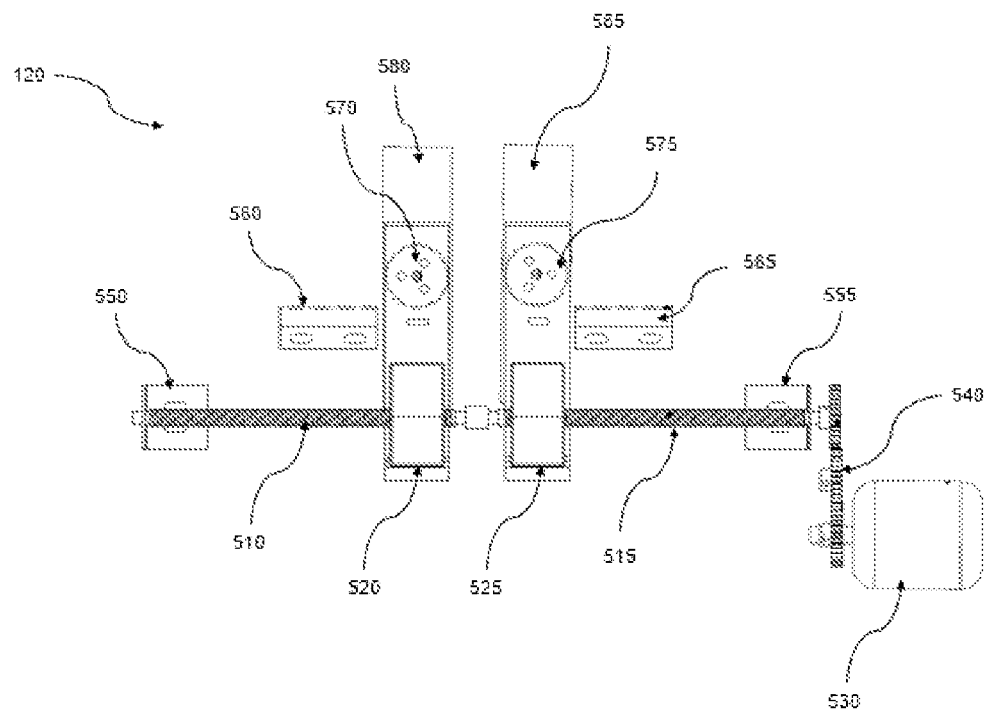
FIG. 4 shows a partitioning mechanism according to an embodiment of the present invention.

Referring FIG. 4 shows a partitioning mechanism (120) according to a preferable embodiment of the present invention. The partitioning mechanism (120) moves the movable heating panels (not shown) to predetermined positions by rotating and moving, to and fro, the movable heating panels. The movable heating panel carriages (580, 585) of each movable heating panels (not shown) move laterally along the worm gears (510, 515) when the motor (530) rotates the worm gears (510, 515). One worm gear (510, 515) has clockwise threads, while the other has anti clockwise threads so that the movable heating panels move away or towards each other. The movable heating panel carriage holders (520, 525) are threaded on the inside and ride on the worm gears (510, 515). Depending on the clockwise or anticlockwise rotation of the worm gears (510, 515), the two (2) movable heating panel carriages (580, 585) move towards or away from each other. The movable heating panels (not shown) are mounted on circular geared pinions (570, 575), and when the movable heating panel carriages (580, 585) move along the worm gears (510, 515), the pinions (570, 575) engage with the stationary geared racks (560,565), which makes the movable heating panels (not shown) rotate to the desired degree as they reach the predetermined position. When the movable heating panels (not shown) are moved along the worm gears (510, 515), the racks (560, 565) and pinions (570, 575) interaction again rotate the movable heating panels (not shown) to the required degree till they reach the predetermined position Referring FIG. 5A shows rotation mechanism (600) of rotational holders (670, 671, 672) adapted to an extendable member (220) connected to the rotation mechanism of the horizontal holding means (660, 665) in the housing (610) according to an embodiment of the present invention. As shown in FIG. 5A, the rotational mechanism (600) is adapted to the extendable member (220). The threads (631, 632, 633) on the threaded shaft (630) engages with the rotational holder gears (620, 621, 622) of the rotational holder (670, 671, 672); once the threaded shaft (630) is locked to the shaft (655) and when the shaft (655) is operated the rotational holder gears (620, 621, 622) start rotating on rotation of the threaded shaft (630).

As shown in FIG. 5A, the skewers (640, 641, 642) are adapted to the rotational holders (670, 671, 672). The rotation of the threaded shaft (630) results in rotation of the rotational holder gears (620, 621, 622), which rotates the rotational holders (670, 671, 672) and thereby the skewers (640, 641, 642) are rotated. The rotational speed of the rotational holders (670, 671, 672) and the horizontal holding means (660, 665) can be controlled through the motor (650) speed based on user preference.

FIG. 5B shows a heating element (225) adapted to the extendable member (220) according to an embodiment of the present invention. The heating element (225) provides additional heat for baking of the food (not shown) placed on the extendable member (220), when inside the oven.

Referring FIG. 6 shows a food holder (700) according to an embodiment of the present invention. As shown in FIG. 6, the top bar-food holder (700) comprises a base frame (710), at least one top bar (730), a horizontal support (735) and a connecting means (720) for connecting the base frame (710) and the top bar (730).

As shown in FIG. 6, the top bar (730) comprises at least one removably adaptable rotatable hook (740, 745) variably locatable on the top bar (730). FIG. 6 B shows a one of the type of height adjusting mechanism (750) for adjusting the height of the connecting means (720). However, various height adjustable means are available and can be incorporated for adjusting the height of the food holder of the present invention.

As shown in FIG. 6A, the top bar (730) connected to the connecting means (720) moves upwards and/or downwards on the connecting means (720) through an adjusting mechanism (760).

As shown in FIG. 6, the dual height adjusting mechanism (750, 760) is useful as the base frame (710) may be kept on the base of the oven, or slid along horizontal edges or shelves or on extendable member in the oven at different heights requiring the total height to be adjusted accordingly.

Referring FIG. 7 shows a food holder (800) adapted over the extendable member (220) having movable heating panels (130, 140). The food holder (800) having food (810, 820) suspended from the rotational hook (740, 745) in two different heating chambers formed by the movable heating panels (130, 140) according to an embodiment of the present invention. As shown in FIG. 7, the movable heating panels (130, 140) provides adequate heating for cooking of the food (810, 820) along with other heating panels provided in the housing.

Figure 8:
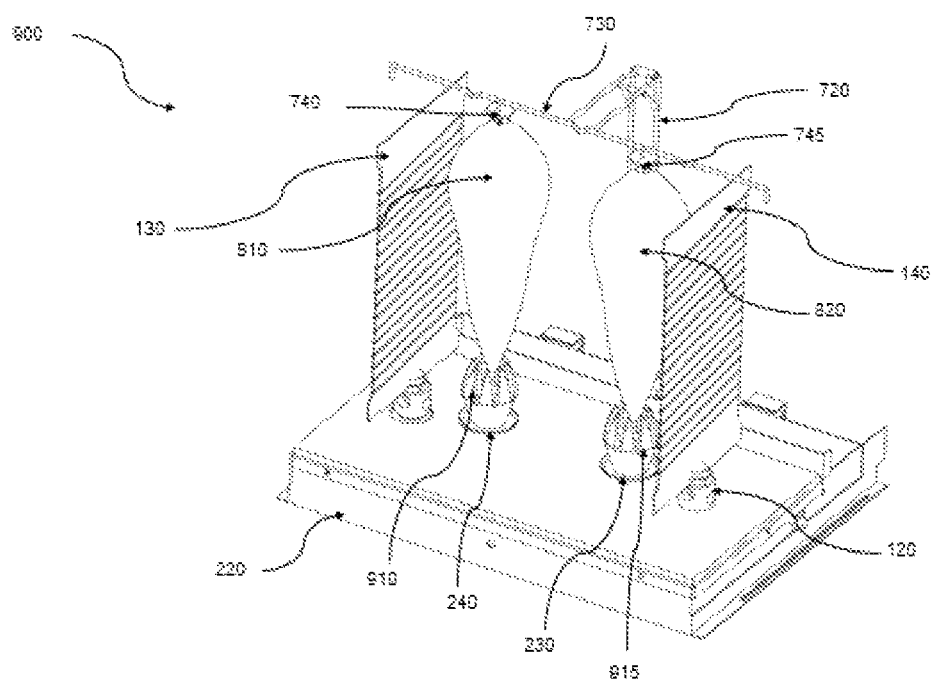
FIG. 8 shows the food holder of FIG. 6 mounted on the extendable member with the food item attached to a clamp adapted to the rotational holder according to another embodiment of the present invention.

Referring FIG. 8 shows a food holder (900) having food (810, 820) suspended from a rotational hook (740, 745) of the top bar-food holder (900) and connected to a clamp (910, 915) adapted to a rotational holder (230, 240) according to an embodiment of the present invention. As shown in FIG. 8, the food (810, 820) are suspended from the rotational hook (740, 745) adapted on the top bar (730) of the food holder (900). The food (810, 820) is connected to the clamp (910, 915), the food (810, 820) rotates when the clamp (910, 915) rotates on operation of the rotational holder (230, 240) thereby allowing entire surface area of the food (810, 820) to receive heat provided from the movable heating panels (130, 140) adapted on extendable member (220), without any need to manually turn the suspended food (810, 820). As shown in FIG. 8, the clamp (910, 915) includes a wired 'hook' or 'pin' (not shown) to attach to the food (810, 820) if it is short of length and if the height of the food holder cannot be adjusted, so that the food item may be rotated. The wired 'hook' or 'pin' (not shown), advantageously supports food items which can't reach the clamp (910, 915).

As shown in FIGS. 7 and 8, the oven is ideal for roasting Corn-on-Cob or similar foods which are difficult to skewer. The food (810, 820) is suspended from the rotational hook (740, 745) of the food holder (800), so that the food (810, 820) receives heat from all sides, with a provision in FIG. 8, to connect the food item (810, 820) such as corn-on-cob to the clamp (910, 915) adapted to a rotational holder of a rotational holder (230, 240), so that the food item (810, 820) can be rotated for more even heating from all sides, if needed.

The foregoing description of the invention has been set merely to illustrate the invention and is not intended to be limiting. Since modifications of the disclosed embodiments incorporating the substance of the invention may occur to person skilled in the art, the invention should be construed to include everything within the scope of the disclosure.

The invention claimed is:

1. An oven system, comprising:
a housing;
at least one heating element provided on at least one wall of the housing to provide predefined heat, each heating element collectively or selectively is controlled to provide the predefined heat;
at least one partitioning mechanism; and
at least one movable heating panel removably or fixedly attached to each partitioning mechanism, the partitioning mechanism includes a holding means for holding the movable heating panel, for movement through slits provided in the wall and a rack-and-pinion and worm gear mechanism that moves or rotates or moves and rotates the movable heating panel in a predetermined direction to form one or more vertically and/or horizontally divided heating compartments within the housing to process food material.

2. The oven as claimed in claim 1, wherein the partitioning mechanism is attached to one or more walls of the housing or to an extendable member parallel to the base of the oven, slidably secured in the housing.

3. The oven system as claimed in claim 2, wherein the partitioning mechanism includes a holding means for holding the movable heating panel, for movement through slits provided in the extendable member, and a rack-and-pinion and worm gear mechanism to move or rotate or move and rotate the movable heating panel within the housing.

4. The oven system as claimed in claim 1, wherein the movable heating panel comprises at least one heating element on at least one of its sides to provide predefined heat in at least one of: a vertical direction and a horizontal direction.

5. The oven system as claimed in claim 2, wherein the movable heating panel comprises at least one heating element on at least one of its sides to provide predefined heat.

6. The oven system as claimed in claim 1, wherein the movement of the movable heating panel by the partitioning mechanism can be automatically or manually controlled.

7. The oven system as claimed in claim 2, wherein the movement of the movable heating panel by the partitioning mechanism can be automatically or manually controlled.

8. The oven system as claimed in claim 1, comprises at least one rotational holder at the base having a mechanism to hold and rotate skewers, food containers, or food stands.

9. The oven system as claimed in claim 2, comprises at least one rotational holder in the extendable member having a mechanism to hold and rotate skewers, food containers, or food stands.

10. The oven system as claimed in any one of claim 1, wherein the rack-and-pinion and worm gear mechanism includes clockwise and anti-clockwise gears enabling movement of the movable heating panels towards or away from each other, while being rotated, to predetermined positions.

11. The oven system, comprising:
a housing;
at least one heating element on at least one wall of the housing to provide predefined heat, each heating element is collectively or selectively controllable to provide the predetermined heat;
an extendable member slidably secured in the housing, the extendable member comprising at least one heating element;
at least one partitioning mechanism; and
at least one movable heating panel removably or fixedly attached to each partitioning mechanism, the partitioning mechanism includes a holding means for holding the movable heating panel, for movement through slits provided in the extendable member and a rack-and-pinion and worm gear mechanism that moves or rotates or moves and rotates the movable heating panel in a predetermined direction to form one or more heating compartments within the housing to process food material.

12. The oven system as claimed in any one of claim 11, wherein the rack-and-pinion and worm gear mechanism includes clockwise and anti-clockwise gears enabling movement of the movable heating panels towards or away from each other, while being rotated, to predetermined positions.

* * * * *